Figure 1:
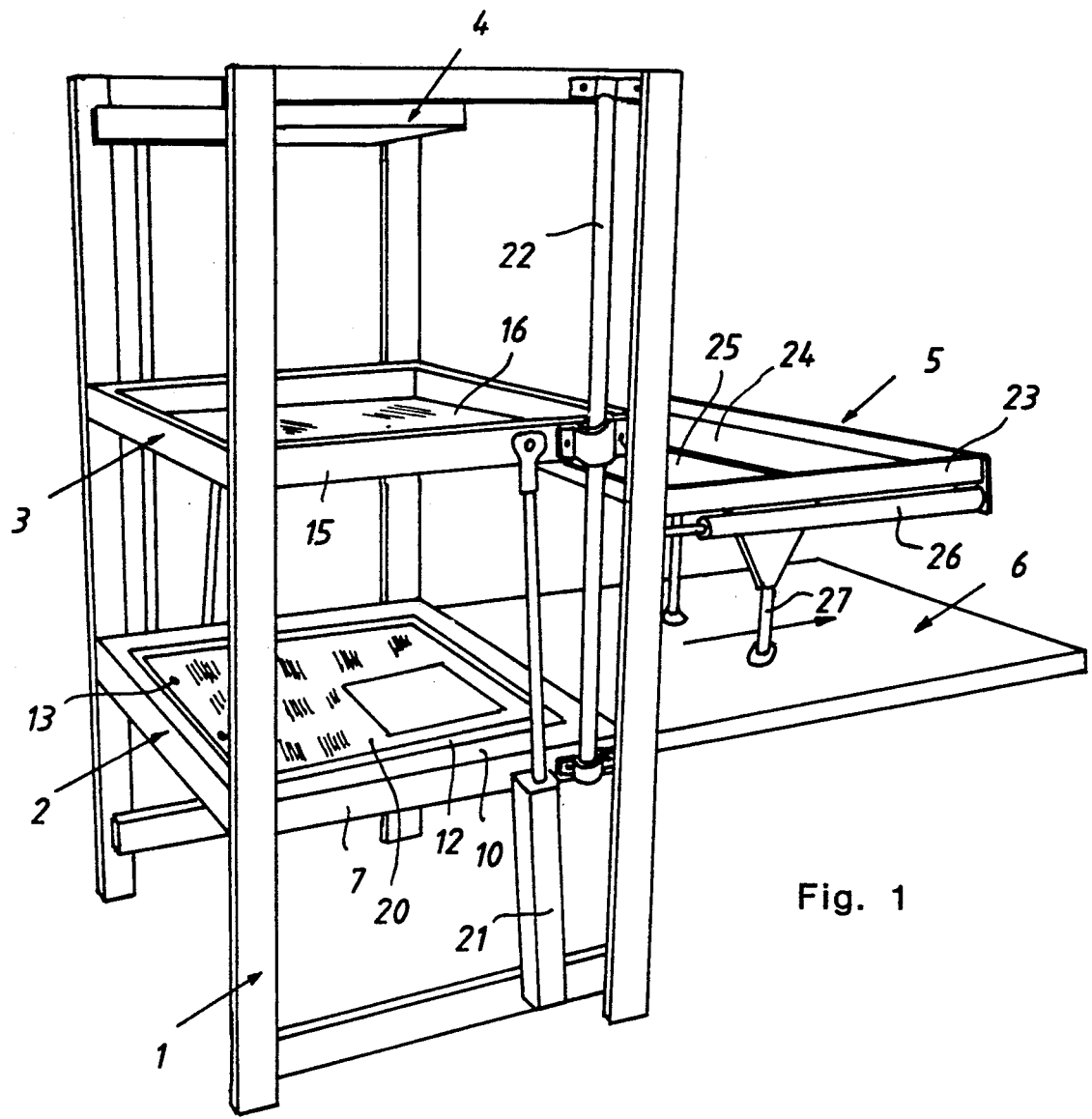

United States Patent [19]

Tuulse

[11] Patent Number: 5,017,960
[45] Date of Patent: May 21, 1991

[54] EXPOSURE OF RADIATION SENSITIVE MATERIALS

[75] Inventor: Tanel Tuulse, Södertälje, Sweden

[73] Assignee: STD Engineering AB, Norsborg, Sweden

[21] Appl. No.: 476,957

[22] Filed: Feb. 8, 1990

[30] Foreign Application Priority Data

Feb. 14, 1989 [SE] Sweden .................................. 8900501

[51] Int. Cl.$^5$ ........................ G03B 27/20; G03B 27/02
[52] U.S. Cl. ........................................ 355/91; 355/132
[58] Field of Search .................... 355/87, 91, 94, 99, 355/132

[56] References Cited

U.S. PATENT DOCUMENTS

| 3,119,318 | 1/1964 | Forester et al. | 355/91 |
| 3,922,087 | 11/1975 | Dillow | 355/87 |
| 4,080,068 | 3/1978 | Madigan et al. | 355/73 |
| 4,576,475 | 3/1986 | Kitagawa et al. | 355/91 |
| 4,754,309 | 6/1988 | Lesko | 355/91 |
| 4,812,883 | 3/1989 | Ohlig | 355/91 |

Primary Examiner—Richard A. Wintercorn
Attorney, Agent, or Firm—Dellett, Smith-Hill and Bedell

[57] ABSTRACT

An apparatus for copying transparent and optionally mask films (19,20) onto a radiation sensitive plate (12) comprises a plate carrier (2) on which one or more radiation sensitive plates (12) and one or more transparent films (20) and optionally mask films (19) can be placed in predetermined mutual positions. The apparatus includes a contact frame (3) having means (18) for vacuum connecting the contact frame (3) to the plate carrier (2) and means (V1,V2) for vacuum connecting the transparent film(s) (20) and the mask film(s) (19) to a contact glass (16) of the contact frame (3). An exposure light (4) is provided for directing radiation through the transparent film(s) (20) and the mask film(s) (19) so as to copy them onto the radiation sensitive plate (12). The plate carrier (2) comprises a flexible support plate (8) which is connected to the apparatus frame (1) only along its outer edges, and which carries a flexible rubber blanket (10), which is connected to the support plate (8) only along its outer edges. The support plate (8) together with the rubber blanket (10) and the radiation sensitive plate (12) are able to bend convexly upwards under the influence of the vacuum and into contact with the contact frame (3) starting at the center of the contact frame (3) and thereafter successively proceeding out in all directions towards the edges of the contact frame (3) until there is a total contact.

7 Claims, 1 Drawing Sheet

U.S. Patent — May 21, 1991 — 5,017,960

EXPOSURE OF RADIATION SENSITIVE MATERIALS

This invention relates to the image-wise exposure of radiation sensitive materials, such as light sensitive films or plates, and is concerned with the exposure of such materials to an original in the form of a transparent film using a printing down frame in the production of, for example, a printing plate, such as an offset lithographic printing plate or intaglio printing plate.

In presently used methods one or more of such transparent films are placed on a radiation sensitive plate and the assembly comprising the plate and film or films is put in a printing down frame having a rigid support, generally covered with a pressure equalizing rubber blanket to carry the radiation sensitive plate and over which a glass plate is pressed. Vacuum is applied between said support and the glass plate to provide a good contact between the film or films and the radiation sensitive plate. The transparent film includes opaque and transparent areas and radiation is directed at the radiation sensitive plate through the transparency so that parts of the radiation sensitive plate are struck by the radiation. The resultant image-wise exposed plate is then developed and further processed to obtain a printing plate for printing.

A problem is to provide the best possible contact between the radiation sensitive plate and the transparent film(s). Even a very slight gap between the two will result in light diffusion and an unsharp image on the plate. Since there may be small unevenesses both in the rigid support and in the radiation sensitive plate and even in the film(s), contact gaps frequently occur during exposure, whereby the resultant printing plate is of poor quality and produces poor quality copies.

Several different methods for eliminating this problem have been suggested but with varying success. According to one proposed method the rubber blanket is fixed to the rigid support along its edges only. In this way, it is possible for the rubber blanket to rise slightly from the rigid support during the vacuum suction process. This has made it possible to avoid the existence of the above mentioned contact gaps arising from unevenesses of the rigid support, the radiation sensitive plate, the transparent film(s) or the glass of the printing down frame. On the other hand, however, it may happen that air bubbles become trapped between the rubber blanket and the radiation sensitive plate whereby contact gaps appear for this reason. It also may happen that the rubber blanket moves slightly during the vacuum suction process and this may lead to a displacement of the film(s) in relation to the radiation sensitive plate, and this in turn may lead to an imperfect register in the eventual printed copies. This is, of course, especially disadvantageous in those cases where it is desired to have accurate register between the film(s) and the radiation sensitive plate as in multi-colour printing.

In order to eliminate the problem of contact gaps being caused by air bubbles between the radiation sensitive plate and the transparent film(s) it has been suggested to knead or roll the rubber blanket and, as a consequence, also to knead or roll the radiation sensitive plate before and during the vacuum suction process thereby pressing out any air existing between the radiation sensitive plate and the film(s) and any optionally used mask films via the edges of the apparatus. This is a time consuming and complicated operation which needs skill and care from the operating persons and which, in spite of such skill and care, can still lead to some problems like mutual displacement between the film(s) and the radiation sensitive plate and imperfect register resulting therefrom. The method also is disadvantageous in that it makes it impossible to use register pins extending through or from the rubber blanket for locating the plate and the film(s) in exactly predetermined positions in relation to each other. The reason for this is that the register pins would obstruct the roll or kneading means. Further, there is no support surface for the rubber blanket and the system requires various machine parts and is complicated and expensive to manufacture.

In an inverted printing-down method, (that is a system in which the exposure light is provided from underneath, the or each transparent film is placed at the bottom and the radiation sensitive plate is placed above the film(s), it has been suggested, for the same reason, to use a roll-curtain like rubber blanket which is rolled out progressively from one side of the vacuum frame to the other, whereby the air between the plate and the film(s) is successively pressed out and the risk of the appearance of air pockets is reduced. However, this method is also time consuming and complicated. Further, in this method, there is the risk that the film(s) and the plate may be slidingly displaced in relation to each other thereby causing an imperfect register. In this case also it is impossible to use through register pins for locating the plate and the film in exactly predetermined mutual positions. Further, since the cover glass plate is facing downwardly, it is also difficult or impossible to check, by visual control, that there is a good contact between the film(s) and the radiation sensitive plate. This system also requires several different machine parts and is technically complicated and expensive to manufacture.

It is an object of the present invention to provide a method and an apparatus for image-wise exposing a radiation sensitive plate to a transparent film without the aforementioned disadvantages.

According to one aspect of the present invention there is provided a method of image-wise exposing a radiation sensitive material which comprises the steps of (i) superposing the radiation sensitive material and an original in the form of a transparent film carrying opaque areas, (ii) urging the radiation sensitive material and the original together by firstly applying pressure at their central areas and then successively widening the area of pressure application from the central areas towards the edges of radiation sensitive material and of the original so as to expel from said edges any air present between the radiation sensitive material and the original whereby the radiation sensitive material and the original are in total contact, and (iii) directing radiation at the radiation sensitive material through said original.

According to another aspect of the present invention there is provided an apparatus for image-wise exposing radiation sensitive material through an original in the form of a transparent film including opaque areas, which apparatus comprises (i) a plate carrier, (ii) a support in said plate carrier for supporting the radiation sensitive material and said original, said support comprising a resilient blanket secured at its edges to a flexible support plate which is secured at its edges to the plate carrier, (iii) a contact frame including a rigid transparent plate and being capable of sealingly contacting the plate carrier to define a closed chamber containing the radiation sensitive material and said original and bounded by the transparent plate the support, (iv) a means of applying vacuum to said chamber to cause said support to adopt a dome-like configuration which firstly urges the central areas of the radiation sensitive material and the original against the transparent plate and then successively applies pressure to wider areas of the radiation sensitive material and the original until total contact occurs between the radiation sensitive material and the original, and (v) a source of radiation located to direct radiation through said transparent plate and said original and onto the radiation sensitive material.

In accordance with a preferred embodiment of the invention, there is provided a method of copying a transparent film onto radiation sensitive material, especially in the production of offset printing plates or intaglio printing plates, using an apparatus comprising (i) a plate carrier for the radiation sensitive material and one or more transparent films (including text or an image) and optionally one or more mask films, (ii) a contact frame which has a contact glass and which can be raised and lowered, and (iii) means for providing both a vacuum for vacuum-connecting the contact frame to the plate carrier and also a vacuum for vacuum-connecting the transparent and mask films to the contact glass, which method comprises placing one or more radiation sensitive materials on the plate carrier, applying one or more transparent and optionally mask films in a predetermined position on the radiation sensitive material(s), and lowering the contact frame into contact with the plate carrier carrying the radiation sensitive material and the transparent and mask films, wherein the radiation sensitive material(s) is/are vacuum connected to the sensitive material(s) is/are vacuum connected to the plate carrier by a predetermined vacuum strength, the transparent and mask films are vacuum connected to the contact glass of the contact frame, the radiation sensitive material is brought into contact with the contact frame together with the transparent and mask films by means of a vacuum, whereby the radiation sensitive material adopts an upwardly convex bow formation and is brought into contact first with the central part of the contact frame and thereafter successively further out from the centre of the contact frame until there is a total contact between the contact frame and the radiation sensitive material, and an exposure light is illuminated and the transparent and mask films are copied on to the radiation sensitive material.

In accordance with another preferred embodiment of the invention there is provided an apparatus for copying transparent and optionally mask films onto radiation sensitive material, in particular in the production of offset printing plates or intaglio printing plates, which apparatus comprises (i) a plate carrier on which one or more radiation sensitive materials and one or more transparent films and optionally mask films can be placed in predetermined mutual positions, (ii) a contact frame having a contact glass and a means for vacuum connecting the contact frame to the plate carrier and means for vacuum connecting the transparent and mask films to the contact glass of the contact frame, (iii) and an exposure light for exposing the transparent and mask films and copying them onto the radiation sensitive material(s) wherein (iv) the plate carrier comprises a flexible support plate which is connected to the apparatus frame only along its outer edges and which carries a flexible resilient blanket which is connected to the support plate only along its outer edges and on which the radiation sensitive material(s) is/are placed, whereby the support plate together with the resilient blanket and the radiation sensitive material(s) have the possibility of bowing convexly upwards, depending on the forces acting thereon, and into contact with the contact frame to exhibit a centre-press effect, starting at the centre of the contact frame and thereafter successively proceeding outwards in all directions towards the edges of the contact frame until there is a total contact.

The present invention enables the radiation sensitive material and the transparent film to be quickly and accurately located in exactly determined mutual positions with a minimum risk of air pockets being present between the radiation sensitive material and the transparent film and a minimum risk of mutual displacement occurring between the transparent film and the radiation sensitive material.

The essence of the invention is based on the observation that it is possible to provide a press effect on the radiation sensitive material and the transparent film (which effect may be referred to as a "centre-press effect") which is characterised in that the pressure initially is applied at the centre and the area of application is then successively widened in all directions outwards from the centre towards the edges whereby any existing air is pressed out in an optimum way so as to obtain total contact.

The arrangement is preferably such that the resilient blanket and the radiation sensitive material are vacuum connected to the flexible support plate by means of sub pressures. Preferably the force exerted by the subpressure connecting the resilient blanket to the flexible support plate referred to herein as the "blanket vacuum", is less than the force exerted by the final pressure for vacuum connecting the transparent film to the radiation sensitive material referred to herein as the "contact vacuum". In this way during the initial stages of vacuum connection (suction) operation, the resilient blanket and the radiation sensitive material will, together, be fixed to the flexible support plate, so that the assembly of the flexible support plate, the resilient blanket and the radiation sensitive material is subjected to the above mentioned convex bow formation so that the central areas of the radiation sensitive material and the transparent film are contacted together and then, as the "contact vacuum" becomes greater than the "blanket vacuum", the resilient blanket lifts off from the support plate thereby contacting together the remaining areas of the radiation sensitive material and the transparent film. In this way any unevenesses present are equalised to give optimum contact between the transparent film and the radiation sensitive material.

Figure 2:
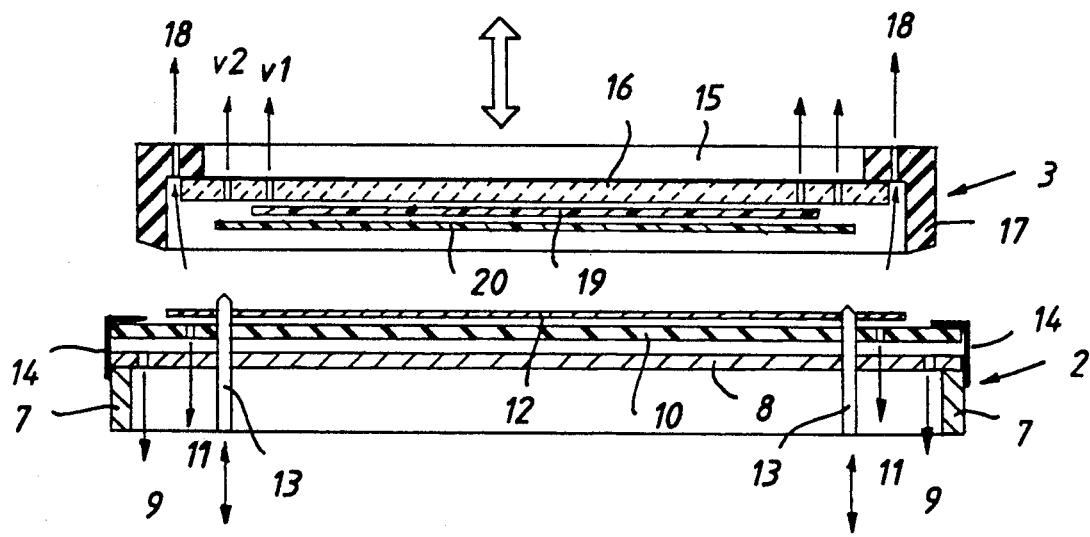

For a better understanding of the invention and to show how the same may be carried into effect reference will now be made, by way of example, to the accompanying drawings, in which FIG. 1 diagramatically and in perspective view shows a printing down frame in accordance with the present invention, and FIG. 2 is a section through a part of the apparatus of FIG. 1.

The illustrated apparatus is adapted for contact printing a light sensitive plate 12 (for use in for example the production of an offset plate or an intaglio plate) or a film or a similar radiation sensitive material by exposing the same to an original in the form of a transparent film. The apparatus is formed as an integral unit comprising a machine framework 1 in which are mounted a plate carrier 2, a contact frame 3, an exposure light 4, a film magazine 5 and a conveyor 6 for feeding image-wise exposed plates to a developing machine.

As is most clearly shown in FIG. 2 the plate carrier 2 comprises a rigid frame, for instance made of frame bars 7, extending around the periphery of the frame, and cross bars. A flexible and movable support plate 8 is mounted on the rigid frame. The support plate 8 is preferably made of metal and it is, for instance, connected to the frame bars 7 but merely lies freely on the cross bars. The cross bars are provided only for supporting the support plate 8 so that it does not sag. The support plate 8 is formed with vacuum bores 9, and on the top surface of the plate 8 there is a system of vacuum channels for retaining a flexible rubber blanket 10 (for instance an offset rubber blanket) to the plate 8 by vacuum. The rubber blanket 10 is connected to the flexible support plate 8 at its outer edges at intervals or by a continuous joint. The rubber blanket 10 is also formed with vacuum bores 11 and on the top side of the blanket there is a system of vacuum channels for retaining the light sensitive plate 12 (for example for use in the production of an offset printing plate) to the blanket 10 by vacuum. Several register pins 13 extend both through the support plate 8 and through the rubber blanket 10. The plate 12 and one or several originals (in the form of transparent films 20 carrying opaque areas representing text or a picture) include corresponding register pin holes and can thereby be superposed in an exactly predetermined mutual relationship, i.e. into so called "register". The register pins 13 can be raised and lowered along their respective longitudinal axes in the directions shown by the arrows. Consequently, they are withdrawn and moved away when the light sensitive plate 12 is brought together with the transparent film or films. The rubber blanket 10 and the flexible support plate 8 can be sealingly connected together by means of a sealing and connecting strip 14 extending round the edges thereof, as indicated in FIG. 2.

The contact frame 3 comprises a rigid frame bar 15 extending around the periphery of the frame and to which a contact glass 16 is mounted. The contact frame has a downwardly facing plate sealing rim 17 of rubber or an equivalent sealing material extending around its periphery which is intended to give a good seal against the plate 12. Vacuum bores 18 pass through the rim 17 beyond the extremities of the glass plate 16. The bottom surface of the glass plate 16, i.e. the side of the glass facing the plate 12, is formed with one or preferably two sets of vacuum channels V1 and V2. Inner vacuum channels V1 are for retaining a mask film 19 to the glass plate 16 by vacuum and outer vacuum channels V2 are for retaining an original (i.e. a transparent film 20 generally carrying a text and/or an image) to the glass plate 16 (and to the mask film 19) by vacuum. The mask film 19 has lesser outer dimensions than the transparent film 20 and also lesser outer dimensions than the outer vacuum bores V2 of the glass plate 16. A vacuum generating means (not shown) is operably connected to the vacuum bores 9, 11, 18 and channels V1 and V2.

As is apparent from FIG. 1 the contact frame 3 can be raised and lowered by means of hydraulic or pneumatic cylinders 21 provided on two or more sides. The contact frame 3 is supported and guided on two or more sides by vertical guide bars 22. It is necessary that the contact frame 3 can be raised to a first position at least slightly above the level of the film magazine 5 and can be lowered to a second position in which it defines a chamber with the plate carrier 2 in which chamber it is possible to provide a vacuum between the contact frame 3 and the flexible rubber blanket 10 with the light sensitive plate 12 mounted thereon so that the transparent and mask films 20, 19 are placed in intimate contact with the light sensitive plate 12.

The exposure light 4 is of a type known per se producing a short wave light radiation, e.g. a halogen light, and it is mounted in the upper part of the machine framework, centrally over the contact frame 3 and the plate carrier 2.

The film magazine 5 is formed as a film box 23 having one or more compartments. In the case where the film box 23 is of the single compartment type the mask film 19 and the transparent film or films 20 are applied manually directly onto the light sensitive plate 12 on the plate carrier 2. It is also possible to form the film box with two (or several) compartments for automatically applying the transparent and mask films 19, 20 on the plate 12, for instance a first compartment 24, in which a set of transparent and mask films 20, 19 are placed (preferably fixed on register pins which are positioned and spaced so as to correspond with the register pins 13 of the plate carrier 2) and a second compartment 25 in which used transparent films 20 and used mask films 19 can be placed. The film box 23 is horizontally displacable, by means of an axial cylinder 26, between a fully withdrawn outer position as shown in FIG. 1 and inner positions in which it is located between the plate carrier 2 and the contact frame 3 when the latter is in its first position wherein it is spaced from the plate carrier 2. In the first of these inner positions, the first compartment 24 (with the unused films and mask films 20, 19) is in a position where these films can be picked up by the contact frame 3, and in the second of these inner positions the return compartment 25 is in a position to received the used transparent and mask films 20, 19.

On the bottom of the film box 23 there are several suction feet, (in the illustrated case two suction feet 27), for picking up the image-wise exposed plate or plates 12 when the film box 23 is in position inside the machine framework 1 and above the plate carrier 2, and for letting said plate or plates 12 down on the conveyor 6 when the film box 23 has been returned to its initial outer position whereupon said conveyor 6 transfers the plate(s) 12 to a developing machine (not shown).

Each of the vacuum bores 9 of the plate carrier 2 in the contact frame 3 is connected to a source of subpressure. It is important to the invention that the "contact vacuum" which is applied via bores 18 to urge the plate 12 and the mask and transparent films 19, 20 together is no weaker, and is preferably stronger, than the "blanket vacuum" which is used for holding the flexible rubber blanket 10 on the flexible support plate 8. In this way the rubber blanket 10, together with the plate 12 can lift off the support plate 8 (particularly in the region between the central area and the edges) and adapt itself to possible unevenesses of the contact frame 3 and of the mask and transparent films 19, 20 held in the contact frame 3 whereby intimate contact occurs between the plate 12 and films 19 and 20 over their entire surfaces.

There are three main aspects of the apparatus:

I. Since the support plate 8 is flexible, the combined assembly of support plate 8 and the flexible rubber blanket 10 and the plate 12 and the films 19, 20 will adopt an upwardly directed dome shape upon initial contact with the contact frame 3, as a consequence of the initial contact vacuum applied by bores 18. Thus the centre of said assembly first comes into contact with the glass plate 16 of the contact frame 3.

II. Since the sub-pressure referred to as the "blanket vacuum" and which holds the flexible rubber blanket 10 in contact with the flexible support plate 8 is equal to or preferably weaker than the sub-pressure referred to as the "contact vacuum" which "sucks" the rubber blanket 10 to the contact frame 3 and thereby holds the mask and films 19, 20 in contact with the glass plate 16, the "contact vacuum" overrides the "blanket vacuum" so that the flexible rubber blanket 10 carrying the plate 12 can rise from the support plate 8 so that the blanket 10, plate 12 and films 19, 20 of the assembly are progressively urged into contact with the glass plate 16 in all directions outwardly from the centre. As a consequence, any air present becomes successively pressed out from the centre towards the edges and hence it is possible to eliminate the risk of air bubbles being trapped between the plate 12 and the films 19, 20 held between the plate carrier 2 and contact frame 3. The blanket 10 adapts itself to any unevenesses of the contact frame 3 carrying the films 19, 20. As a consequence, optimum contact between the films 20 and the plate 12 is achieved, and thereby also the best possible sharpness and register for the exposed light sensitive plate.

III. Because of the presence of the flexible support plate 8 in combination with the flexible rubber blanket 10, it is possible to eliminate the risk that the rubber blanket 10 carrying the plate 12 slides or becomes displaced in relation to the films 19, 20. Hence it is possible to minimise the risk of imperfect register as a consequence of such mutual displacement.

The apparatus functions as follows:

1. The "blanket vacuum" is applied via bores 9 to retain the blanket 10 against the support plate 8;

2. The contact frame 3 is moved (if necessary) to its first position some distance above the plate carrier 2 and the register pins 13 are extended. The plate 12, the transparent film 20 and, in some cases, mask film 19 are mounted, in turn following each other, onto said register pins 13;

3. The contact frame 3 is moved down to its second position where the sealing rim 17 thereof comes into contact with the rubber blanket 10 on the plate carrier 2 to define a chamber between the plate carrier and the contact frame 3;

4. "Contact vacuum" is applied between the glass plate 16 and the sealing rim 17 via vacuum bores 18 to evacuate the chamber so that the vacuum frame 3 becomes fixed to the rubber blanket 10 carrying the plate 12 and the assembly comprising the support plate 8, blanket 10, plate 12, and films 19, 20 adopts a dome-like configuration with its central area in contact with the glass plate 16;

5. As the "contact vacuum" increases and overrides the "blanket vacuum", the rubber blanket 10, the plate 12 and films 19, 20 rise from the flexible support plate 8 in the region between the central area and the edges of the assembly so that they adapt themselves exactly to the contact frame 3 and urge the plate 12 into intimate contact with the films 19, 20 over their entire surfaces;

6. The exposure light 4 is switched on, and the plate 12 is exposed to the light passing through the films 19, 20;

7. The "contact vacuum" applied between the glass plate 16 and the sealing rim 17 is disconnected;

8. Instead of applying vacuum to the bores 18, air is blown into them so that the contact frame 3 is released from the rubber blanket 10 and the plate 12;

9. "Film vacuum" is applied to channels V1 and V2 to retain the films 19, 20 against the glass plate 16 and "plate vacuum" is applied via bores 11 to retain the plate 12 against the blanket 10.

10. The contact frame 3 is lifted to its first position as shown in FIG. 1; and

11. The film magazine 5 is positioned between the contact frame 3 and plate carrier 2;

Thereafter different procedures are carried out depending on the particular circumstances;

12a. The case where one film 20 and one plate 12 are used:

The vacuum for retaining the transparent film 20 and the mask film 19 against the glass plate 16 is disconnected and instead thereof air is blown into the vacuum channels V1 and V2 so that the films 19 and 20 are released from the contact frame 3 and drop down into compartment 24 or 25 of the film box 23. Concurrently therewith the register pins 13 are withdrawn, the "plate vacuum" retaining the plate 12 against the blanket 10 is disconnected, and vacuum is applied to the suction feet 27 of the magazine 5 whereby said feet 27 lift the image-wise exposed plate 12 upwardly from the blanket 10. The film magazine 5 is then moved out again to its outer position carrying the plate 12. The vacuum to the suction feet 27 is disconnected and the plate 12 is let down on the conveyor 6 and is carried away to be developed;

12b. The case where two plates 12 are used:

Where two plates are to be prepared using the same mask film 19 and transparent film 20, the register pins 13 are pulled down; the "plate vacuum" is disconnected, vacuum is applied to the suction feet 27; the image-wise exposed plates 12 are lifted up; the film magazine 5 is moved out together with the plates 12; the register pins 13 are extended; two new plates 12 are placed in position; the contact frame 3 is moved down; and a new exposure is made according to the above steps 4-11;

12c. The case where two different transparent films are used with the same plate:

Where two transparent films 20 (with or without mask films 19) are to be used successively with one and the same plate (twin exposure), the plate 12 is exposed to one of the films 20 and is then allowed to remain with the "plate vacuum" applied via bores 11; the contact frame 3 is raised to its first position; the film magazine 5 is moved to a position under the contact frame 3; the "film vacuum" is disconnected both for the transparent film 20 and for the mask film 19 (if used); instead thereof air is supplied through the vacuum channels V1 and V2 so that the films 19, 20 are released from the contact frame 3 and drop down into compartment 24 or 25 of the film box 23; the film magazine 5 is moved out; a new set of mask film(s) 19 and transparent films 20 is mounted on the already exposed plate 12 and a further exposure is made following the above steps 3-11.

I claim:

1. A method of image-wise exposing a radiation sensitive material which comprises the steps of:
   (i) providing a resilient blanket which is secured, at its edges, to a flexible support plate which is also secured at its edges so that the resilient blanket and the support plate can adopt a dome-like configuration,
   (ii) vacuum connecting the resilient blanket to the support plate by a blanket vacuum,
   (iii) superimposing the radiation sensitive material and an original in the form of a transparent film carrying opaque areas,
   (iv) causing the resilient blanket and the support plate to adopt said dome-like configuration by means of a contact vacuum which exerts a force stronger than the force exerted by the blanket vacuum so that the radiation sensitive material and the original are urged together by pressure firstly applied at their central areas and then over a successively widening area from the central areas towards the edges of the radiation sensitive material and of the original so as to expel form said edges of the radiation sensitive material and of the original any air present between the radiation sensitive material and the original whereby the radiation sensitive material and the original are in total contact, and
   (v) directing radiation at the radiation sensitive material through said original.

2. An apparatus for image-wise exposing radiation sensitive material through an original in the form of a transparent film including opaque areas, which apparatus comprises:
   (i) a plate carrier,
   (ii) a support in said plate carrier for supporting the radiation sensitive material and said original, said support comprising a resilient blanket secured at its edges to a flexible support plate which is secured at its edges to the plate carrier,
   (iii) a means of applying vacuum to the blanket to hold the same against the flexible support plate,
   (iv) a contact frame including a rigid transparent plate and being capable of sealingly contacting the plate carrier to define a closed chamber containing the radiation sensitive material and said original and bounded by the transparent plate and the support,
   (v) A means of applying vacuum to said chamber which means generates a larger force than said means of applying vacuum to said blanket to cause said support to adopt a dome-like configuration which firstly urges the central areas of the radiation sensitive material and the original against the transparent plate and then successively applies pressure to wider areas of the radiation sensitive material and the original until total contact occurs between the radiation sensitive material and the original, and
   (vi) a source of radiation located to direct radiation through said transparent plate and said original and onto the radiation sensitive material.

3. An apparatus as claimed in claim 2 and including a means of applying vacuum to the radiation sensitive material to hold the same against the blanket.

4. An apparatus for image-wise exposing radiation sensitive material through an original in the form of a transparent film including opaque areas, which apparatus comprises:
   (i) a plate carrier,
   (ii) a support in said plate carrier for supporting the radiation sensitive material and said original, said support comprising a resilient blanket secured at its edges to a flexible support plate which is secured at its edges to the plate carrier,
   (iii) a contact frame including a rigid transparent plate and being capable of sealingly contacting the plate carrier to define a closed chamber containing the radiation sensitive material and said original and bounded by the transparent plate and the support,
   (iv) a means of applying vacuum to said chamber to cause said support to adopt a dome-like configuration which firstly urges the central areas of the radiation sensitive material and the original against the transparent plate and then successively applies pressure to wider areas of the radiation sensitive material and the original until total contact occurs between the radiation sensitive material and the original, and
   (v) a source of radiation located to direct radiation through said transparent plate and said original and onto the radiation sensitive material and further including axially displaceable register pins which are extendible through the support plate and the blanket for cooperation with register pin holes in the radiation sensitive material and the original.

5. An apparatus for image-wise exposing radiation sensitive material through an original in the form of a transparent film including opaque areas, which apparatus comprises:
   (i) a plate carrier,
   (ii) a support in said plate carrier for supporting the radiation sensitive material and said original, said support comprising a resilient blanket secured at its edges to a flexible support plate which is secured at its edges to the plate carrier,
   (iii) a contact frame including a rigid transparent plate and being capable of sealingly contacting the plate carrier to define a closed chamber containing the radiation sensitive material and said original and bounded by the transparent plate and the support,
   (iv) a means of applying vacuum to said chamber to cause said support to adopt a dome-like configuration which firstly urges the central areas of the radiation sensitive material and the original against the transparent plate and then successively applies pressure to wider areas of the radiation sensitive material and the original until total contact occurs between the radiation sensitive material and the original, and
   (v) a source of radiation located to direct radiation through said transparent plate and said original and onto the radiation sensitive material wherein the contact frame is perpendicularly movable with respect to the plate carrier between a first position in which it is spaced from the plate carrier and a second position in which it defines said chamber and the apparatus includes a film magazine movable to a position beneath the contact frame, when the contact frame is in its first position, to receive the original from the contact frame after image-wise exposure of the radiation sensitive material.

6. An apparatus as claimed in claim 5, wherein the film magazine is provided with suction feet to lift the radiation sensitive material from the blanket when the film magazine has been moved to said position after image-wise exposure.

7. An apparatus for image-wise exposing radiation sensitive material through an original in the form of a transparent film including opaque areas, which apparatus comprises:
- (i) a plate carrier,
- (ii) a support in said plate carrier for supporting the radiation sensitive material and said original, said support comprising a resilient blanket secured at its edges to a flexible support plate which is secured at its edges to the plate carrier.
- (iii) a contact frame including a rigid transparent plate and being capable of sealingly contacting the plate carrier to define a closed chamber containing the radiation sensitive material and said original and bounded by the transparent plate and the support,
- (iv) a means of applying vacuum to said chamber to cause said support to adopt a dome-like configuration which firstly urges the central areas of the radiation sensitive material and the original against the transparent plate and then successively applies pressure to wider areas of the radiation sensitive material and the original until total contact occurs between the radiation sensitive material and the original, and
- (v) a source of radiation located to direct radiation through said transparent plate and said original and onto the radiation sensitive material and including a means of applying vacuum to the original to hold the same against the transparent plate after image-wise exposure.

* * * * *